United States Patent [19]

Lee

[11] Patent Number: 4,999,833
[45] Date of Patent: Mar. 12, 1991

[54] NETWORK CONNECTIVITY CONTROL BY ARTIFICIAL INTELLIGENCE

[75] Inventor: William C. Lee, Corona Del Mar, Calif.

[73] Assignee: ITT Corporation, New York, N.Y.

[21] Appl. No.: 287,742

[22] Filed: Dec. 20, 1988

Related U.S. Application Data

[63] Continuation-in-part of Ser. No. 125,738, Nov. 30, 1987, abandoned, which is a continuation of Ser. No. 731,189, May 6, 1985, abandoned.

[51] Int. Cl.$^5$ .............................................. H04J 3/24
[52] U.S. Cl. .................................. 370/94.1; 370/58.3; 370/60; 370/94.3; 340/825.02; 340/825.06; 364/513
[58] Field of Search ............... 370/60, 94.1, 58.1, 370/58.2, 58.3, 60.1, 94.2, 94.3; 455/62; 364/513; 340/825.02, 825.06

[56] References Cited

U.S. PATENT DOCUMENTS

| | | | |
|---|---|---|---|
| 4,320,500 | 3/1982 | Barberis et al. | 370/94.1 |
| 4,601,586 | 7/1986 | Bahr et al. | 370/94.1 |
| 4,670,848 | 6/1987 | Schramm | 364/513 |
| 4,779,208 | 10/1988 | Tsuruta et al. | 364/513 |

OTHER PUBLICATIONS

Hayes-Roth et al., "Building Expert System", 1983, pp. 129-131, 287-326.

Primary Examiner—Benedict V. Safourek
Assistant Examiner—Alpus H. Hsu
Attorney, Agent, or Firm—Arthur L. Plevy

[57] ABSTRACT

A communications system utilizes artificial intelligence to select connectivity paths among various locations in a communications network. An embodiment shown is that of a packet radio network, wherein an artificial intelligence module, located at one or more of the radio sites in the network, applies a set of heuristic rules to a knowledge base obtained from network experience to select connectivity paths through the network. The artificial intelligence module comprises an inference engine, a memory for storing network data obtained from a radio receiver and transmitting it to the inference engine, a memory connected to the inference engine which stores a set of heuristic rules for the artificial intelligence system, and a knowledge base memory which stores network information upon which the inference engine draws. The knowledge base memory is also capable of feeding back network information to the rule base memory, which can thus update its rules. Also shown is an embodiment of a multimedia communications network.

17 Claims, 10 Drawing Sheets

FIRST KNOWLEDGE BASE (13)

| TIME TAG | PATHS | LINKS | MIN. LINK QUALITY | # OF LINKS |
|---|---|---|---|---|
| $t_i$ | x i | xogi | $L_i$ | 3 |
| $t_{i+1}$ | x i | xCjfi | $L_{i+1}$ | 4 |
| $t_{i+2}$ | x i | xAogi | $L_{i+2}$ | 4 |
| $t_{i+3}$ | x d | xged | $L_{i+3}$ | 3 |
| $t_{i+4}$ | x d | xgebd | $L_{i+4}$ | 4 |

SECOND KNOWLEDGE BASE (14)

| TIME TAG | PATHS | LINKS | LINK TRAFFIC CONDITION |
|---|---|---|---|
| $t_j$ | xi | xogi | light |
| $t_{j+1}$ | xd | xged | heavy |
| $t_{j+2}$ | xw | xpnw | light |
| $t_{j+3}$ | xe | xge | light |

FIG. 6

| START | END | MINIMUM LINK QUALITY (RELATIVE LEVEL IN dB) | NUMBER OF LINKS | PATH |
|---|---|---|---|---|
| x | f | -180 | 3 | xCjf |
| C | f | -180 | 2 | Cjf |
| j | f | -180 | 1 | jf |
| x | m | -185 | 2 | xCm |
| x | l | -166 | 2 | xgl |
| x | w | -186 | 2 | xpw |
| x | w | -181 | 3 | xpnw |
| x | i | -190 | 3 | xogi |
| x | i | -190 | 4 | xCjfi |
| x | i | -190 | 4 | xAogi |
| x | i | -190 | 4 | xBogi |
| x | q | -185 | 3 | xgrq |
| x | i | -188 | 2 | xgi |
| x | p | -158 | 1 | xp |
| p | n | -181 | 1 | pn |
| x | B | -175 | 1 | xB |
| x | d | -192 | 3 | xged |
| x | d | -180 | 4 | xgebd |
| x | o | -186 | 1 | xo |
| x | z | -191 | 3 | xpnz |
| x | n | -181 | 2 | xpn |
| x | v | -185 | 2 | xgv |
| e | a | -190 | 1 | ea |
| g | a | -190 | 2 | gea |
| x | a | -190 | 3 | xgea |
| x | z | -187 | 2 | xCz |
| e | c | -175 | 1 | ec |
| g | c | -175 | 2 | gec |
| x | c | -175 | 3 | xgec |
| g | e | -184 | 1 | ge |
| x | e | -184 | 2 | xge |
| x | A | -172 | 1 | xA |
| x | j | -182 | 2 | xCj |

PRA PACKET RADIO WITH AI

FIG. 10

NETWORK CONNECTIVITY CONTROL BY ARTIFICIAL INTELLIGENCE

This is a continuation in part of Ser. No. 07/125,738 filed on Nov. 30, 1987, which is a continuation of Ser. No. 06/731,189 filed on May 6, 1985 both entitled "Network Connectivity Control By Artificial Intelligence" and both now abandoned.

BACKGROUND OF INVENTION

This invention relates to a system for establishing connectivity for radio networks and, more particularly, to the use of artificial intelligence (AI) techniques and concepts to provide a basis for establishing connectivity among various radios of a network. Particular attention is paid to the use of artificial intelligence in a packet radio network, although it should be emphasized that the concepts disclosed herein are applicable to all communications systems utilizing radios as repeaters.

Packet radio systems may be generally described as groups of radio transceivers intermittently exchanging short burst or "packets" of digital information. The packets of digital information modulate the very high frequencies (VHF) or ultra-high frequencies (UHF) at which packet radio systems operate. Generally, at any particular instant in time only one radio of the system can operate in the transmission mode while all other radios are in a receive mode. The packet sent by the transmitting radio contains the addresses of the receiving locations and the originating terminal in a header, as well as the digital information being transmitted.

Problems arise when two radios attempt to transmit simultaneously or nearly simultaneously. When transmitted packets interfere with each other in this manner, they must be retransmitted at different later times.

Another important feature of a packet radio system is that the connectivity paths established in such a system require each radio in the network to act as a repeater in retransmitting messages to stations too distant to be reached directly by the original transmitting station.

The paper "Advances in Packet Radio Technology" submitted by Robert E. Kahn et al in the Proceedings of the IEEE, Volume 66, No. 11, pages 1468–1496 (November 1978) discloses a packet radio system having one of more network control nodes called stations. Connectivity and routing for this system are provided by conventional software programs maintained at the stations which must be dedicated to the routing connectivity of the network. In Kahn's system, the control stations perform labeling functions which keep track of the locations of packet radios (some of which can act as relays) and the number of hops associated with routing through these packet radios. This requires a periodic broadcasting of identification signals called "Radio-on Packet" signals from the packet radios to the central station.

The Kahn system requires careful attention to the numerical ratio of stations to radios and the interaction between stations controlling different sets of radios in different geographical areas of the network. Thus, the stations handle the routing for each of the radios throughout the network, and loss or failure of a station results in a lack of operability for a period of time until another station is accessed or the original station replaced. If no station is available, each radio at a particular network segment can operate in a broadcast mode to establish a route to a particular destination.

Another prior art system is disclosed in the paper "A Distributed Routing Design for a Broadcast Environment" by Jil Wescott and John Jabin, presented on pages 10.4–1 to 10.4–4 of the IEEE MILCOM Proceeding, Oct. 18–20, 1982. This system employs a routing algorithm, known as tiered rings, which functions by building a distributed tree of shortest path routes to each packet radio in the network. The algorithm is fixed and employs periodic broadcasting.

The paper "Dynamic Routing and Call Repacking in Circuit-Switched Networks" by A. Girard and S. Hurtubise, which appeared in IEEE Transactions on Communications, volume COM 31, No. 12, December 1983 discloses the use of various algorithms in routing strategies for packet-switching networks.

One problem with the systems mentioned above which employ the conventional algorithmic approach to routing packet radio systems is that a large active network using this method will require significant storage space and processing time to provide these routing indicators. Also, such systems may not be able to process in real time. Additionally, the conventional algorithmic approach is not flexible. When an unexpected situation occurs, such systems cannot provide any solutions. The conventional algorithmic approach can provide one solution if all the expected inputs are available, but no solutions otherwise.

The system of the present invention has a primary object the use of artificial intelligence to determine the routing and connectivity of a radio, static, or mixed network.

The system of the present invention has as a further object the elimination of all central stations, thus providing for a stationless mode of network connectivity as a normal procedure (not as a degraded mode of operation as in prior art systems). The elimination of these vulnerable network routing nodes (stations) has a significant positive impact on cost, survivability and availability of communications in tactical packet radio networks such as are used by the military.

Still another object of the present invention is to minimize the use of the broadcast mode in which each radio operates in a transmission mode to establish a route to a particular destination. Instead, the created knowledge base for the systems of the subject invention is acquired from the available information obtained from routing indicators and information during the normal operation of packet transmissions through the network.

These objects and other advantages are achieved in accordance with the inventive principles described herein for applying artificial intelligence (AI) to radio networks. The specific embodiment of the invention disclosed herein relates to the use of an AI system for automatic network routing and connectivity in a packet radio network. Network control nodes (stations) may be retained in a network and enhanced by this AI system, but are not required. Unlike previous systems, the system described herein is not rigidly dependent on algorithms but has the flexibility inherent in AI systems.

More specifically, the system of the present invention comprises a method and apparatus for adding artificial intelligence modules to at least some of the radios in a conventional packet radio network. The artificial intelligence module is in the form of a distributed AI apparatus board which comprises a microprocessor acting, in part, as an inference engine, a programmable read only memory (PROM) functioning as a rule base, a memory for storing knowledge bases, a random access memory (RAM) for storing various information such as message headers, as well as standard input/output control units, a keyboard unit, and buffers.

The major differences between a radio system using an AI packet radio transmission system, and that using an algorithm for routing, are as follows:

a. In conventional programming, if a system is not completely defined, an algorithm can still be chosen and programmed. However, when more complete specification of the system is obtained, requiring the algorithm to be modified or changed, the whole program must often be rewritten. In a rule based AI system, the rules are simply changed without affecting the remainder of the program (the production system).

b. The AI system can provide a solution from its knowledge base, frequently updated, with a very rapid response during actual routing operations, but the algorithm program must always make a complete calculation, running the data base input through the algorithm in order to obtain a solution.

c. AI has the flexibility for self-learning, but algorithmic programming does not, and instead can only use adaptive methods (as noted in the aforementioned Westcott article).

d. AI provides several good solutions but the algorithmic solution gives only an optimum one. In certain situations, the optimum solution does not exist.

BRIEF DESCRIPTION OF THE DRAWINGS

Principles of the invention may be better understood from a reading of the following description in conjunction with the drawings in which.

DETAILED DESCRIPTION OF THE DRAWINGS

Figure 1:
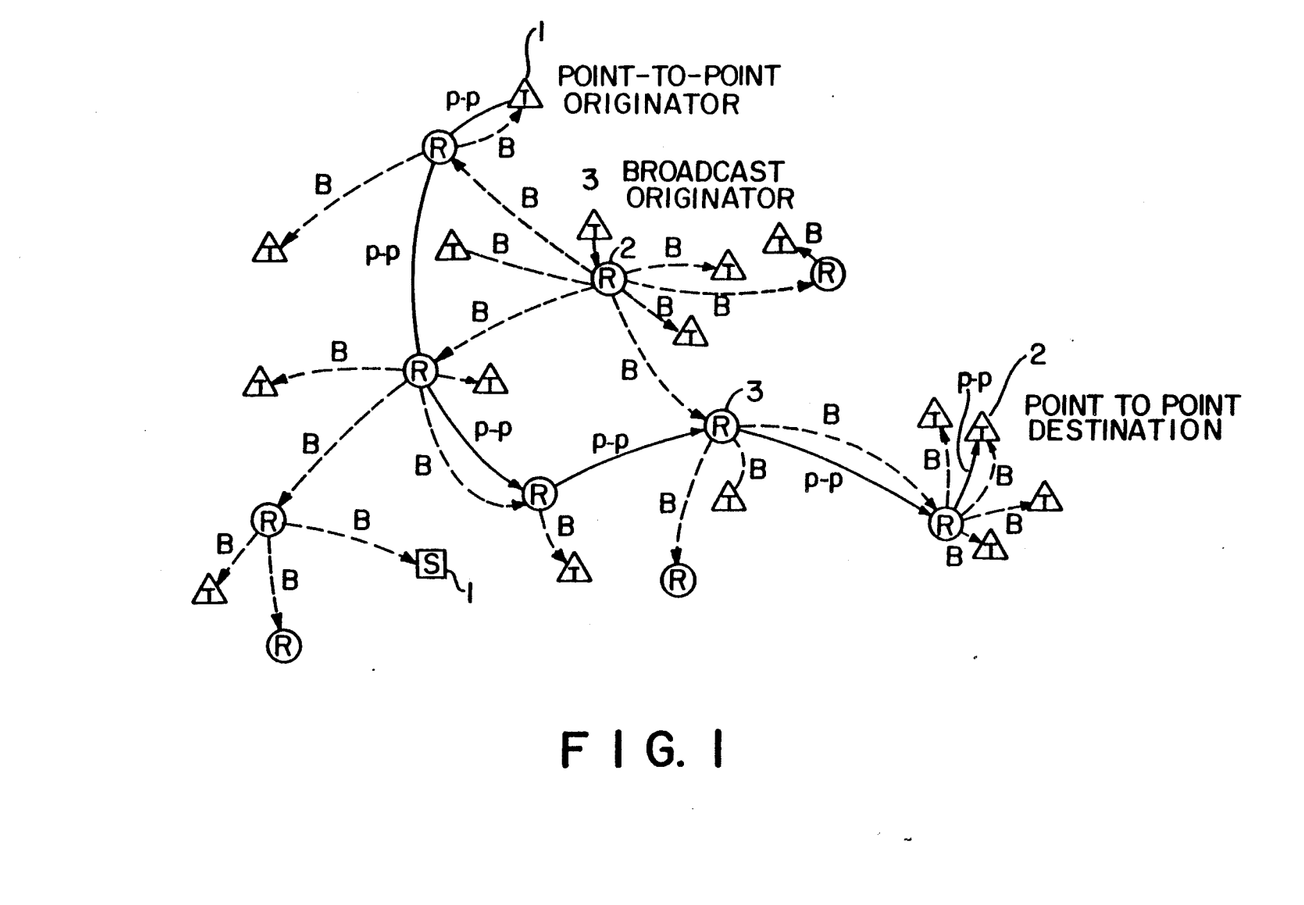
FIG. 1 discloses a schematic of a prior at packet radio network.

FIG. 1 shows a typical prior art packet radio network. In this figure, the blocks designated T represents user terminals comprising a radio transceiver, as well as a digital processor which contains appropriate memory and microprocessor for respectively storing and processing the digital information which is exchanged with the other packet radios in the network. The digital processor contains algorithms for the connectivity and routing for this system.

In FIG. 1, the letter R designates a repeater, and the letter S denotes a central control station. Also, the letters P—P indicate a point-to-point connection and the letter B indicates a broadcast connection.

In the point-to-point routing procedure, a packet originating at one part of the network proceeds directly through a series of one or more repeaters until it reaches its final destination. The point-to-point route is first determined by a central station node which is the only element in the network which knows the current overall system connectivity.

An alternative method of communication in the aforementioned prior art network is the operation of each packet radio in a broadcast mode to establish a route to a particular destination. Obviously, this is not a particularly efficient mode of operation for two party communications in a network. However, such a transmission mode may become necessary when a central station node is lost for any reason.

As with the packet radio network of the present invention, all elements of the aforementioned prior art packet radio network can be mobile, or certain elements can be fixed while others are in motion. The prior art system, however relies on one or more network control nodes (stations). Routing for this system is provided by conventional software programs contained at the stations, which must be dedicated to the routing and connectivity of the network. In this system, the stations perform labeling functions which keep track of the locations of packet radios (PR), which can act as relays, as well as the number of links associated with routing through these packet radios. The system requires careful control of the numerical ratio of stations-to-radios and the interactions between stations controlling different sets of radios in different geographical locations in the network. The stations handle the routing for each of the radios throughout the network, and loss or failure of the station results in a lack of operability for a period of time until another station is accessed or the original station is replaced. Should no station be available, as mentioned previously, each of the radios can operate in a broadcast mode to establish a route to a particular destination.

The stationless network disclosed by the present invention eliminates the need for carefully developed protocols stated in complicated software algorithms and for the consequent inefficient use of air time for transmission of radio location and routing information between stations and radios. The present invention enhances the conventional algorithmic approach by adding the flexibility and simplicity inherent in the use of artificial intelligence for distributed routing. It also provides for the use of AI alone when insufficient data are available for an algorithmic solution.

The stationless routing scheme assisted by AI allows each network radio to determine its own best estimates of the routing by use of an associated AI system with a knowledge base which is acquired, developed, and maintained in real time after the radio joins the network. The use of the inefficient broadcast mode to obtain routing is seldom necessary. Instead, the AI data base is first obtained from routing indicators and information during the normal operation of packet transmissions through the network. Although the data bases associated with the packet radio as used in the present system may be less complete than in the case of a network using stations, this situation is overcome by the use of a rule base associated with a heuristic approach to generate a knowledge base. This heuristic approach gives several outstanding estimates of the routing required. The heuristic approach may use other information such as statistical criteria for establishing routes. The end result is a significant reduction in transmission time for routing through the network, and thus an improved utilization of the network for message traffic. In the artificial intelligence system of the present invention, the suggested route is up to date, and the system allows the user to obtain it instantaneously. In the prior art systems, the acquisition period of the optimum route depended on the complexity of the algorithm being used at the time of the user request.

Figure 2:
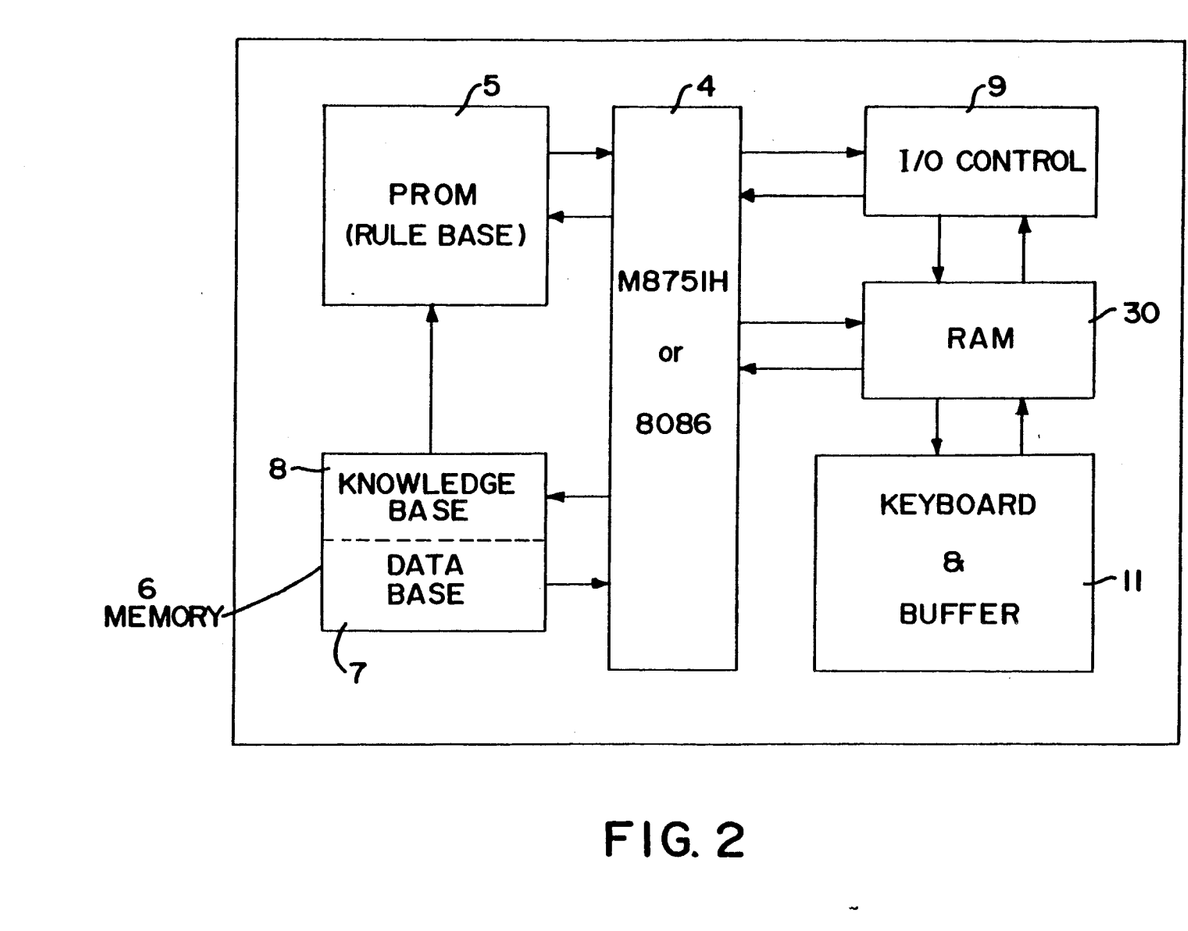
FIG. 2 discloses a block diagram of the artificial intelligence module.
Figure 3:
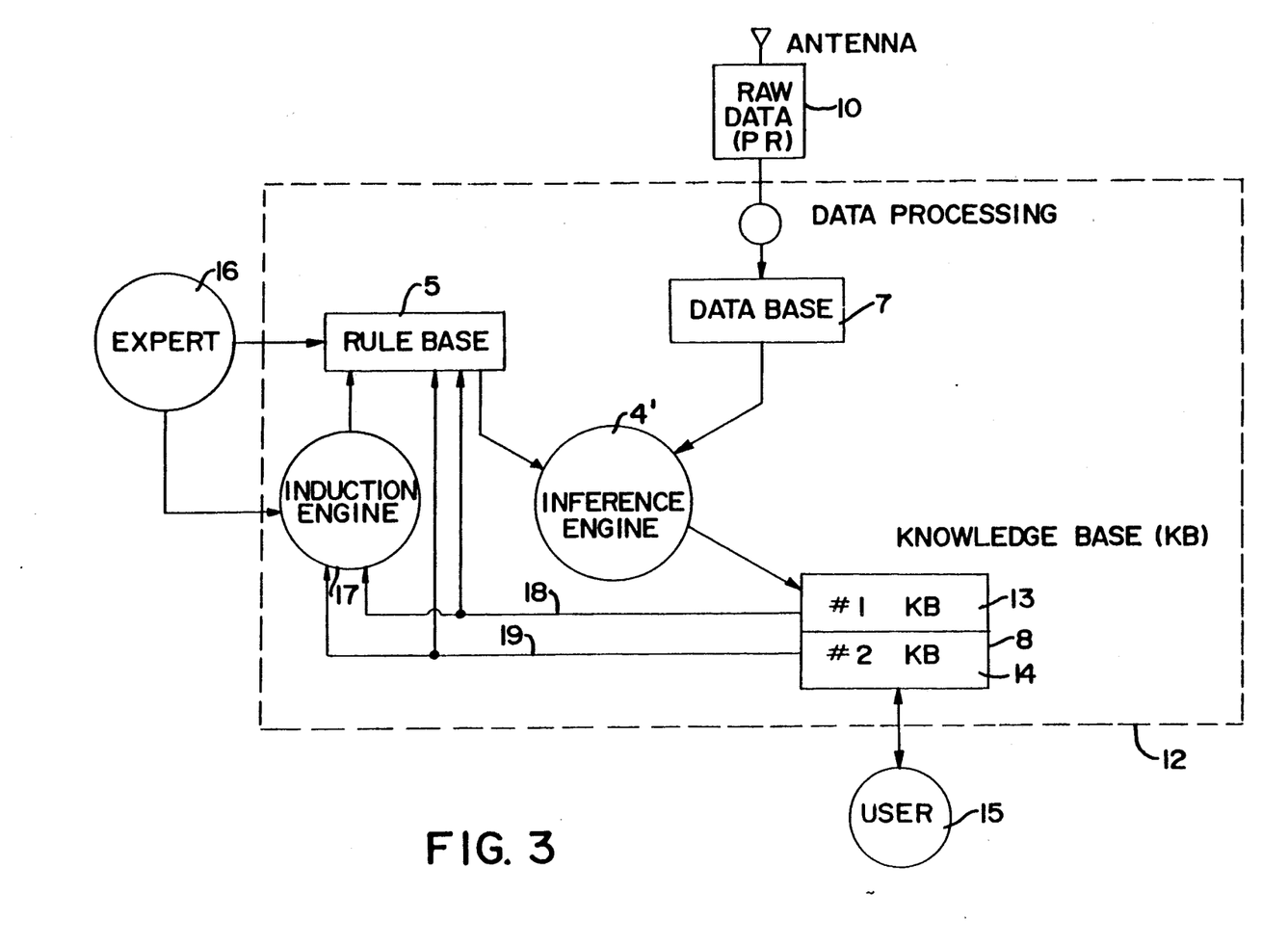
FIG. 3 discloses a detailed schematic of the artificial intelligence module and its interface with the packet radio network.

FIG. 2 shows a block diagram of the artificial intelligence module of the invention. In this diagram, reference numeral 4 denotes a microprocessor which functions, in part, as the inference engine of the artificial intelligence scheme. Microprocessors which might be used include either the M8751H or the 8086, both manufactured by Intel Corporation. Other components of the artificial intelligence module include the memory 6, which is divided into a data base 7 and a knowledge base (KB) 8 which has two sections 13 and 14 (KB #1 and KB #2 as shown in FIG. 3), a programmable read only memory (PROM) 5, which functions as the rule base for the AI system, and a random access memory (RAM) 30, which stores such information as message headers and is accessible by both the keyboard 11 and the input/output unit 9. Also present are an input keyboard and buffer unit 11 and an input/output control unit 9.

FIG. 3 shows a schematic indicating operation of the artificial intelligence module. The packet radio (PR) 10 shown in FIG. 3 to which the artificial intelligence module 12 is connected may be of the type shown in FIG. 6 of the aforementioned article "Advances in Packet Radio Technology", which was described with reference to FIG. 1 of the present application. With regard to FIG. 1, it is noted that a transceiver T and a repeater R are shown to be generally located at the same physical site, and that the artificial intelligence module will be mounted together with these modules whenever it is desired to add the desired artificial intelligence feature to a particular packet radio in the network. Alternatively, all transceivers T can be repeaters, as noted in the aforementioned Westcott article.

In a typical mode of operation, a PRA (PR using AI) which comprises a packet radio such as known in the prior art together with the artificial intelligence module, will be placed into a packet radio network which is already in operation. When the PR transceiver is first turned on, the PRA will obtain raw data from the PR network real time packet headers which are flowing from radio to radio. The data is processed, for example, by the microprocessor 4, and stored in the data base 7 of the PRA. In order to shorten the updating of the PRA data base, it is also possible to have the data base 7 loaded initially from a neighboring radio which is already operating in the network. Continuous updating of this data base will proceed as the network is monitored by the associated packet radio 10.

The inference engine 4' scans the data in the data base, matching this data with the criteria from the rule base 5 through the heuristic approach to generate information for the knowledge base 8 which consists, for example, only of routings which meet the minimum criteria established by the rule base 5. Initial rules are provided by the expert 16. The rules do not need to be in order. The knowledge base 8 will then contain a number of routing sequences each for a number of paths through the network between any potential originator radios and designation radios. If for some reason the first path chosen is not workable, the system has the ability to supply second, third, or as many options as may be necessary until the possible solutions are exhausted. Such multiple path information is stored in section 13 of the knowledge base. Its other section 14 contains only one route for each path. The information in the knowledge base 8 is updated in real time. Since the rule base provides the heuristic criteria, complete transmission paths can be derived when only partial path information is available.

The capacity for selecting rules or deleting rules may also be established in rule base 5. In FIG. 3, a feedback loop is shown from the knowledge base 8 to the rule base 5 by which modification, by selecting or deleting, of the rules can be made based on information in the knowledge base 8. The rules in the rule base at the time when the system begins operation can be preprogrammed, or a set of rules can be derived by running various examples through the system.

Alternatively, the rules for the rule base 5 may be formulated by an induction engine 17 which operates by induction on information found in the knowledge base. One such induction engine program is EXTRAN (example translation), a program developed by Professor Michie of the University of Edinburgh. The expert 16 can either provide rules directly or give the examples which can be converted to rules by the induction engine.

It should be emphasized that the network control artificial intelligence system shown in FIG. 3 provides good sequences even when there is insufficient information to define a well structured transmission problem. Unlike the prior art systems which depend from a single routing algorithm to give, assumably, an optimum solution to a transmission path problem, the present system is flexible enough to suggest several good routing solutions. This is true even though the packet radio with artificial intelligence is required to meet stringent requirements on size, weight, processing speed, and power, such as would obtain for radio in a tactical military environment.

Figure 4:
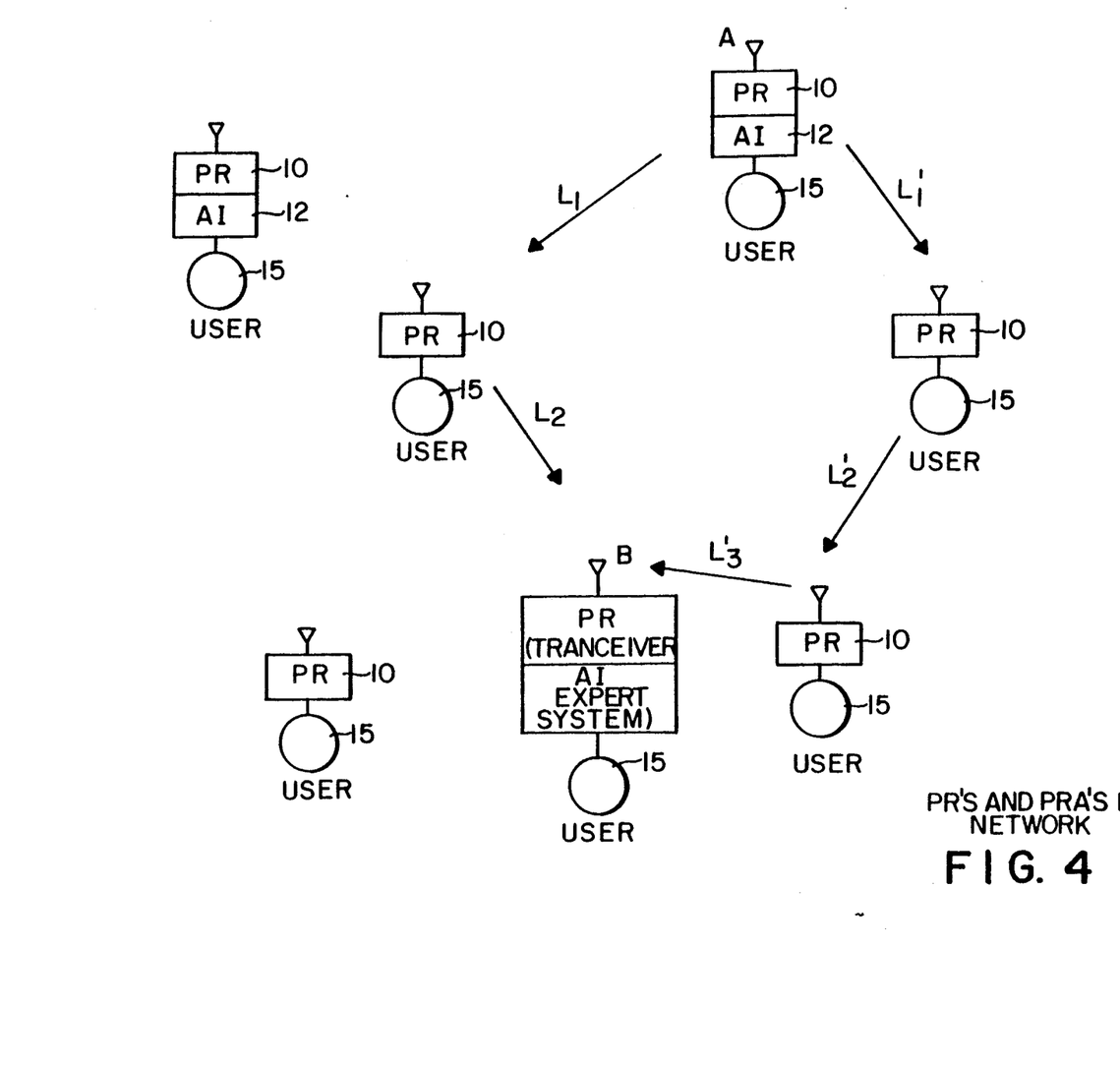
FIG. 4 shows a packet radio network according to the present invention.

FIG. 4 shows a typical packet radio network in accordance with the present invention. As shown therein, some of the packet radios 10 are not equipped with the artificial intelligence module 12 whereas others are so equipped.

Figure 5:
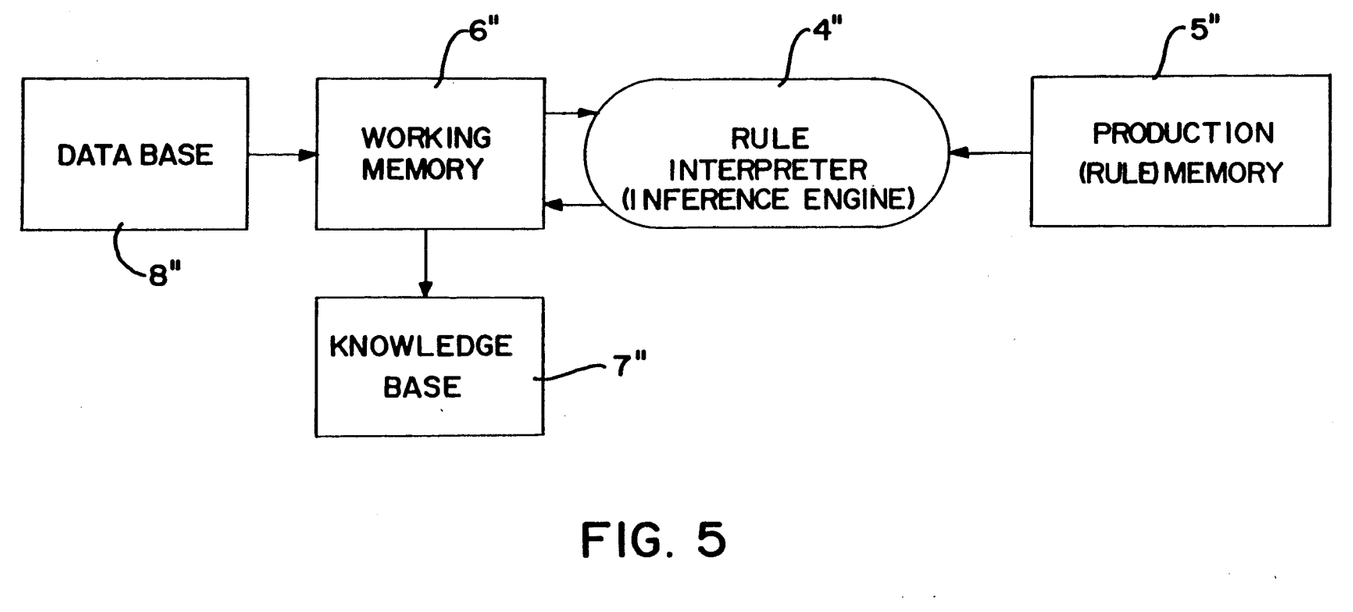
FIG. 5 shows a block diagram of the various system elements with which the OPS5 programming language interacts.

The basic architecture for the exemplary OPS5 programming language used for the artificial intelligence function in the present invention is shown in FIG. 5. The OPS5 language, developed by Carnegie-Mellon University, is a member of the class of programming languages known as production system languages. The various elements shown in FIG. 5 function as follows:

Every rule in production (rule) memory 5" contains the form of "if conditions then do actions".

For purposes of convenience, the conditions are considered to be the left hand side (LHS) and the actions are considered to be the right hand side (RHS) of the formula. The working memory 6" attributes values to the input data. Then the rule interpreter (inference engine) 4" does a "recognize act cycle" as follows:

Step 1: The working memory 6" and LHS of a rule are matched.

Step 2: One rule with a satisfied LHS is selected.

Step 3: The actions specified in the RHS of the selected rule are performed.

Step 4: Go to step 1.

A typical rule for the present system employing OPS5 in the above-mentioned format is as follows:

If: There is an active message for PRA goal and there is a PRA name and there is no path between goal and name but there is a connection between goal and some other PRA subgoal and this is not already a subgoal, Then: Make a new subgoal of getting to subgoal record the path between the goal and subgoal renew the time tags on the message and the PRA.

The "if" part is the "conditions" part representing LHS, and the "do" part is the "actions" part representing RHS. Both LHS and RHS are stored in the production memory 5".

A typical application for the present system might use up to 100 rules. All the rules for the network connectivity are relatively simple. Thus, only portions of the OPS5 language must be used. Since such an amount of software can be easily handled by the microprocessor previously mentioned in the system, it is entirely feasible to regard each packet radio network as a candidate for obtaining distributed AI apparatus.

A typical operational scenario for the packet radio network begins with a system of packet radios that grows gradually from a very small number called into the field in a tactical situation. In this scenario, all packet radios with the AI modules (PRA) may be assumed to be located on mobile vehicles such as jeeps. There are no stations or control nodes as previously described with reference to the prior art in the present system. Initially, therefore, there will be little routing information in the knowledge base of each PRA. There may be contact with fixed locations employing a PRA, although the scenario does not require this. Thus, initial communications with the system will be the transmission of packets from radios (PRs) to their neighbors. Of course, some of these transmissions will reach PRs with AI modules (PRAs). As the digital packets flow between the radios, the data base of the PRAs will begin to build. As more PRAs join the network, use of the relay or repeater mode among radios will increase. The AI module in each PRA will abstract information from the traffic data received, and from the headers from the traffic data that it relays, so as to gradually build up its knowledge base of routing sequences to the various destinations. By the time the network is fully operational, the PRAs will have ongoing useful knowledge for routing to all or nearly all destinations in the network. The effectiveness of a packet radio network is maximized by having each PR of the network employ an AI module.

After the system has become fully operational, the AI system at each PRA will continue monitoring the system, thus abstracting information each time a packet is relayed or a neighbor is heard to maintain the knowledge base in real time and thus establish or maintain the usable routing sequences in the knowledge base of the PRA. The invention allows the use of distributed routing in the following manner. If suggested routing information is available in the knowledge base, a PRA may transmit, as an originator, a packet complete with a header which indicates a suggested routing sequence to a destination. The packet will then move from PRA to PRA with no requirement for a broadcast mode with each radio transmitting. Also, a flood search mode, wherein a PRA broadcasts as originator to determine available links to a desired destination, is not necessary. Moreover, with this concept, each PRA may modify the routing as the packet moves downstream and arrives at a PRA with better routing information in the direction of movement. If an originator has insufficient information on the complete routing sequence to his desired destination, then an incomplete routing sequence may be transmitted and completed by downstream PRA's as the packet moves along its path. This capability allows the use of a true distributed routing approach through the network. Furthermore, a second choice of routing or a third one can be provided if the first one fails.

When a PRA starts to join a network which is already in operation, its knowledge base is essentially empty. Upon joining the network, there are two options as follows:

1. If there is sufficient time and the PRA can wait, then its knowledge base may be built by monitoring its neighbors and acquiring routine information in real time from the headers transmitted.
2. Upon arrival at the network, the new PRA will request from one of its neighbors, the stored knowledge base information resident at that PRA to allow immediate entry to the network, and also can copy the stored knowledge base of neighboring PRA into its own knowledge base.

A PRA near the center of the network will be called upon more frequently to relay information and will build its knowledge base more rapidly and completely than those PRAs on the periphery of the network. Thus, the data stored in the knowledge base will vary, depending on the geographical location of the PRA. Based on a simulation, a maximum size knowledge base for 29 PRAs in a network approximates six kilobits of data. Transfer of this knowledge base to a neighbor entering the network could be accomplished in a matter of a few seconds. A more abbreviated data base for this number of participants in a network can be accomplished in less than one second.

The routing information stored in the knowledge base will give information on the quality of each link in the system for which information has been acquired. A link is defined as a radio connection between two neighbors (a one hop connection). Time-tagged information will be available in the PRA data base on the quality for each link. This quality factor can be path loss, or bit error rate, or other indicators of the link quality. This information is originally obtained as the result of a transmission between two PRAs and is applied by the relaying PRA to its header, in addition to other previous link qualities shown in the header, before transmission. This provides additional link quality data for each link to the relay stations further downstream toward the destination. Each PRA then processes this information to determine the paths which consist of multiple links from itself to any destination in the network. For each possible path to a given destination, the link in each path with the lowest link quality is used for comparison purposes. The path with its poorest link having the highest quality among other poorest links in other paths is used to determine the path to a given destination that will be stored ultimately in the PRA knowledge base. An example shown in FIG. 4 has two paths from PRA A to PRA B. Assume that $L_2$ and $L'_2$ are the poorest links and $L'_2$ is greater than $L_2$. Some of the routing criteria that may be applied to determine the best of several paths to a given destination are as follows:

(a) Elapsed time (based on time tags), with more recent information receiving higher weights;
(b) Link quality;
(c) Level of traffic over a particular link or, alternatively, delay through the link;

Many other types of criteria can be readily applied in this system and stored in the knowledge base to be operated upon by the rule base. These criteria can also be modified by application of statistical information based on known probabilities related to the network.

Figure 6:
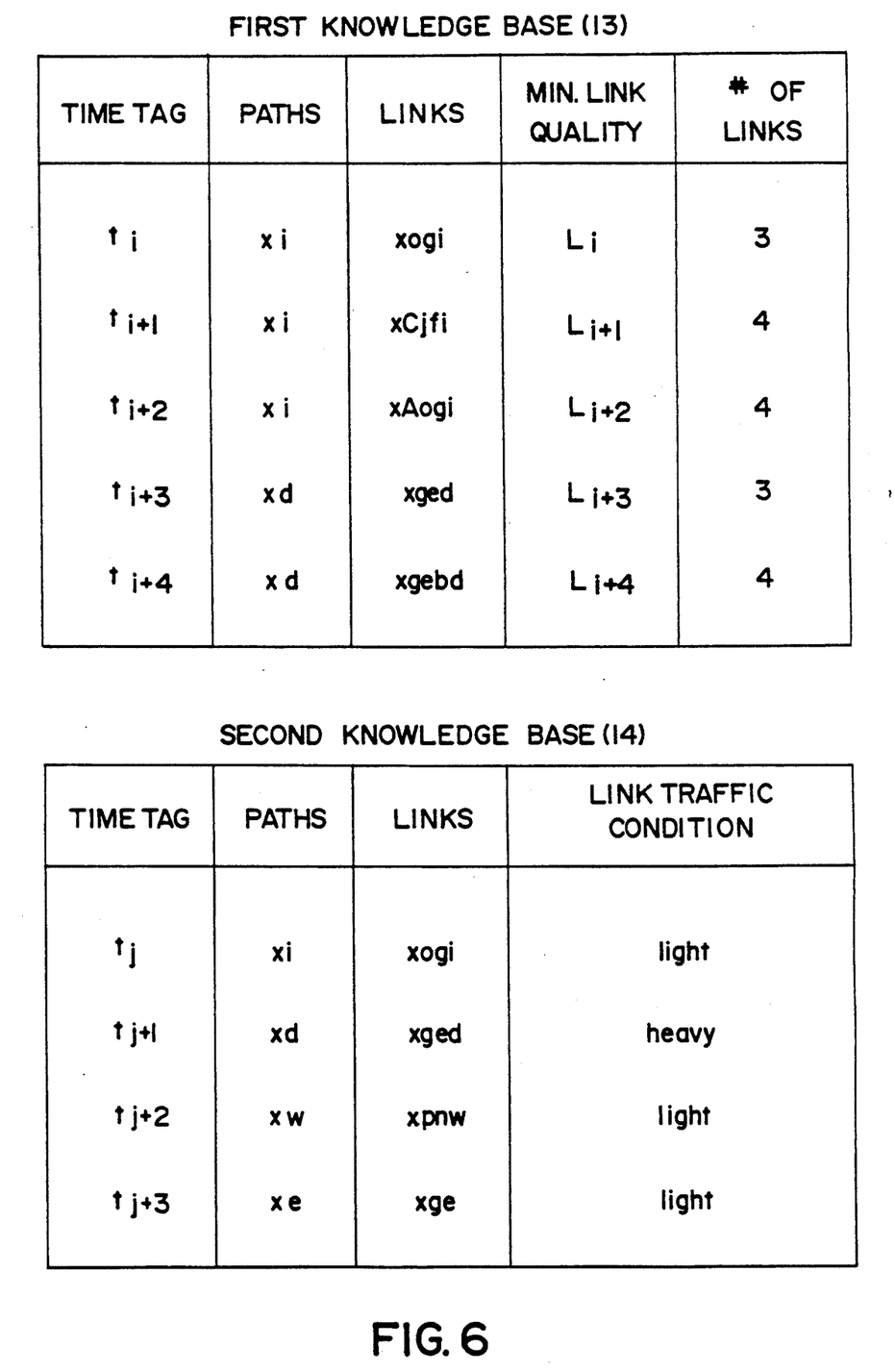
FIG. 6 shows examples of the data stored in the knowledge bases of the artificial intelligence module.
Figure 7:
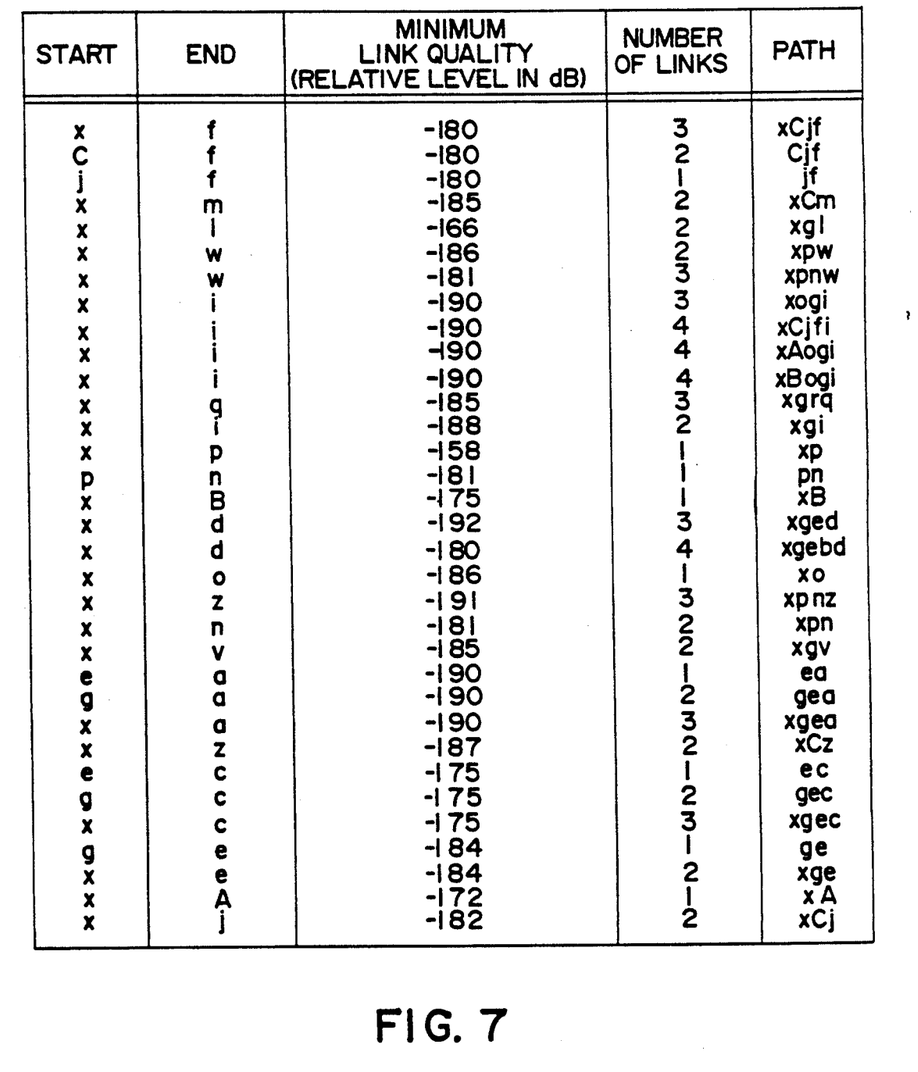
FIG. 7 shows a printout of information in the aforementioned knowledge base.

An example of the data stored in knowledge bases 13 and 14 is given in FIG. 6. This table was based on information developed during the running of the aforementioned simulation. A printout of data stored in knowledge base 13 for the simulation is shown in FIG. 7.

This system has been simulated on a VAX 11/780 system, running Berkeley 4.2 UNIX. The overall simulation has been developed in the LISP language, but the portion related to AI is done in the OPS5 language, as mentioned above.

The situation being simulated here is a stationless network of packet radios. These radios are distributed at pre-determined, random locations in a plane. In the demonstration of the AI network, the network simulation has the following capabilities:
(a) originate, relay, and receive messages;
(b) flood search;
(c) send messages with an address, i.e., with a relay sequence specified in the header; and
(d) record the history of message traffic that is passed through or received by PRAs or which is acknowledged by a PRA to which a message has been sent.

The link quality between radios in the network is simulated by a standard transmission formula. This calculated value is probabilistic and changes with time. There is a graphical display of the radios and the paths that the messages take. The simulation provides a means to generate traffic on a network and to record the traffic which a given PRA sees.

In the graphics display of the network, each PRA is labeled with an alphabetical designation, and the length of each link (the distance between adjacent radios) is calculated. The program next computes the propagation path loss for each link using a path loss calculation based on mobile communications over a flat terrain. This path loss calculation is modified each time a packet transmission through the link is simulated. When the simulation program attempts a link transmission, the path loss calculation for that link is repeated and is modified by a random generator which applies a standard deviation of ±8 dB. It is assume that the PRA moves around within a half mile of its general location to avoid targeting. This simulates mobile radio propagation effects in the range of 1500-2000 MHz. If the link quality is below an acceptable level, the message transfer is considered to have failed. In a real network, the message would be retried after a time out for acknowledgement. In the simulation, the message is retried on an unacceptable link quality six times before canceling transmission.

As a message is passed through the network, the route it has taken and the quality of the links is sent in the header of the message. When a PRA, which is either a relay PRA, a destination PRA, or a nearby PRA, receives a message, it copies this record for its own data base.

In order to initialize the simulation (i.e., establish the data base for each PR at the initialization stage of the AI demonstration), an arbitrary flood search is used. A random choice of originator for the flood search is used each time it is carried out. The random generator is used to choose 29 separate originators and destinations and carry out 29 floor searches. During this portion of the initialization stage, information on the routing through one PRA is acquired by its associated data base and may be displayed on a terminal associated with the VAX simulation. The PRA receives routing information which comes to it by way of its operation as a relay from the message it receives, and from acknowledgements from messages it sends. Acknowledgements are especially rich sources for information as they contain the path which the acknowledgement message took along with its link quality measures at each link, as well as the original path and its quality measures. What is contained in the data base and, ultimately, in the knowledge base, is derived from this information:

The transformation of the data base of paths into knowledge about link connectivity is done by the OPS5 production language modules. While it is possible to have every radio be able to perform this transformation, it is sufficient for a demonstration of the principles involved to have only one such PRA. The transformation involves storing all explicit paths, decomposing paths and quality measures into pair-wise elements, and incorporating these pair-wise elements into the knowledge base. Currently, this incorporation is done by averaging the link quality with the earlier link qualities and keeping track of the number of times a link has been used.

This form of network initialization was chosen instead of the actual scenario described above in order to establish the network operation simply and rapidly for the simulation. In actual practice, with a network having all PRs with AI modules (PRAs), the knowledge base acquisition will take place over time or through information transferred from a neighbor as described above.

The remainder of the simulation follows the system operation described above, and, in particular, the operation with respect to FIG. 3 above. This portion of the simulation is programmed on the OPS5 language and performs in the same way that a system would perform in actual operation in the field.

The demonstration begins with the initialization by simulated flood searches as described above to establish the network configuration and link operation for the purpose of the AI demonstration. When this initialization scheme has been completed, the chosen PRA has sufficient information stored in its knowledge base to allow transmission of routing headers for most of the destinations in the network. The operation of the initialization procedure can be displayed, showing how the flood search packets propagate out through the network to the end points for each flood search that is initiated. Since the flood searches are originated from PRA elements by random choice, some originators may be repeated and some PRAs may not be used as originators at all. Note that this system of network initialization could be viable if one wishes to postulate a scenario in which all network PRAs arrive in their geographic locations simultaneously and wish to begin transmitting packets immediately. However, this scenario has not been used as a basis for the demonstration.

Following the network initialization, packet transmissions through the network can be simulated by choosing a destination.

Suitable graphics display the propagation of the packet through the network from originator to destination. An originator will send the packet out with an incomplete header (broadcast), if it is not the PRA. If the originator is the PRA, it will check whether it knows a path from itself to the chosen destination. If it does, it addresses a message with that path and sends it out. If it does not, it will determine whether a path can be found by backward chaining through the links it knows about. If such a path can be found, the message is sent out and the path stored for future use. A second suggested path can also be requested. The first knowledge base and the inference engine will produce the answer. If no path can be found, the message is broadcast.

If the PRA receives a broadcast message (i.e., one with an incomplete header), it determines whether it knows a path from itself to the destination of the message. In this instance, the reasoning is the same as if it had originated the message.

Data can be displayed from the knowledge and data bases of the PRA. The information displayed will indicate time tag, link quality, and specified link routing sequence (from radio to radio) through the network to a given destination.

The packet radio system of the present invention makes practical the use of distributed routing in a PR network. A small lightly-used network may employ distributed routing with conventional algorithmic establishment of routing sequence indicators for the packet headers. However, a large active network using this method will require significant storage space and processing time to provide these routing indicators. On the other hand, the AI system of the present invention makes possible the independent establishment of good routing sequence indicators at each PRA. In addition, routing updates can be applied downstream by each PR since some of these PRs may possess more viable routing sequence data in their knowledge bases. The use of an efficient symbolic language, such as OPS5, for the AI software aids in keeping reasonable the size, weight, cost, and energy requirements for the microprocessor-based hardware of the AI module.

Figure 8:
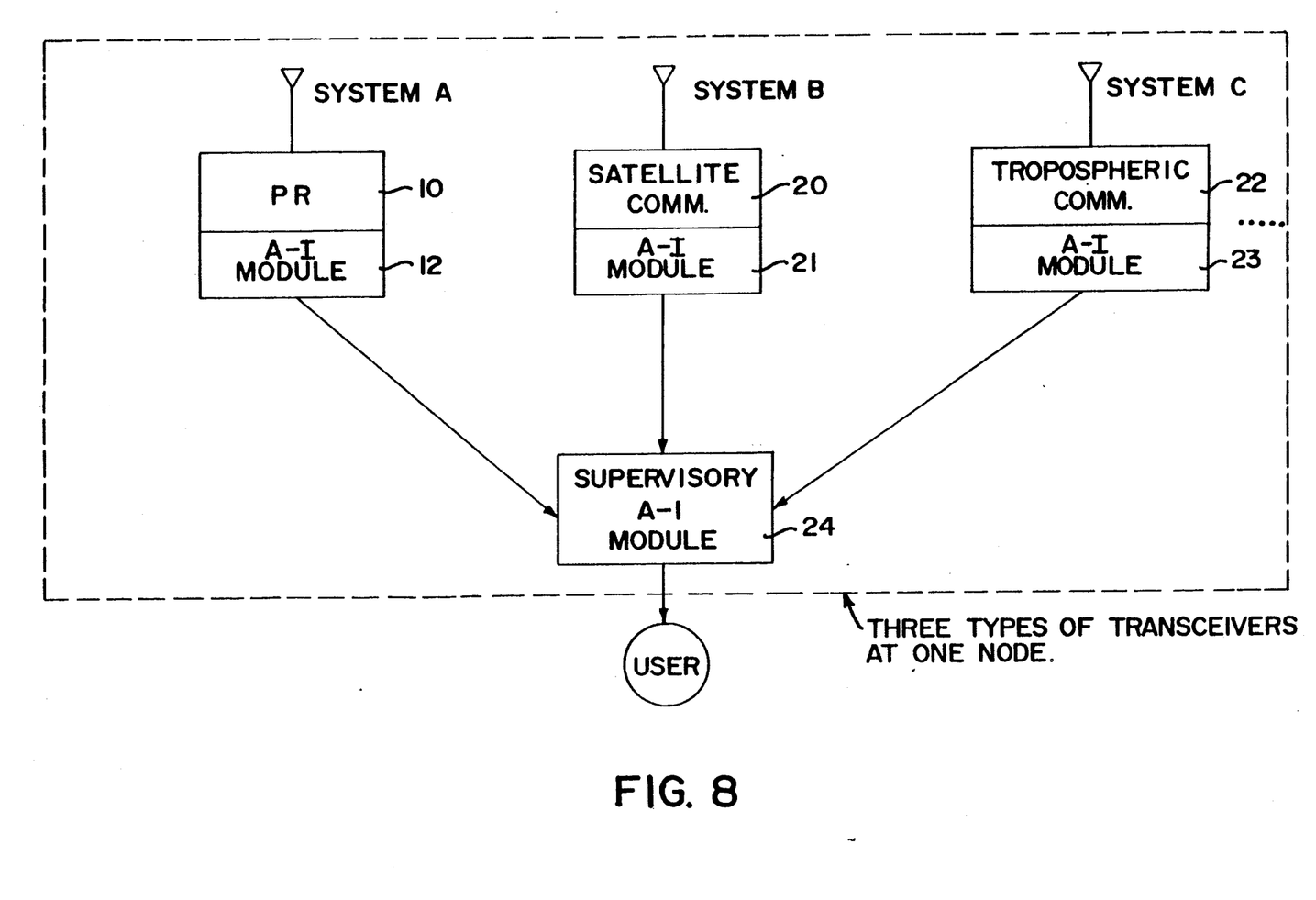
FIG. 8 shows a block diagram of a multi-media system employing AI modules.

Another capability of the AI system of the present invention is its use in multimedia communication systems. Thus, as shown in the example of FIG. 8, each of a plurality of communication systems (here, three systems—System A (packet radio), System B (satellite communication system), and System C (tropospheric communication system)) can have an AI module appended thereon. Each of these AI modules acts in the fashion of the one described above with reference to a packet radio network in selecting an optimum transmission path. However, the multimedia communication system of FIG. 8 also contains a supervisory AI module 24 which operates in the same manner as the AI module for the packet radio system, i.e., in its use of a production system language, such as the OPS5 language, an inference engine, a knowledge base memory, a data base memory, and a memory base of heuristic rules. The multimedia AI system applies the heuristic rules to select an optimum transmission path among the best paths of each of the three systems, as selected by each individual AI module, 12, 22, and 23, for each system with which it is associated.

Figure 9:
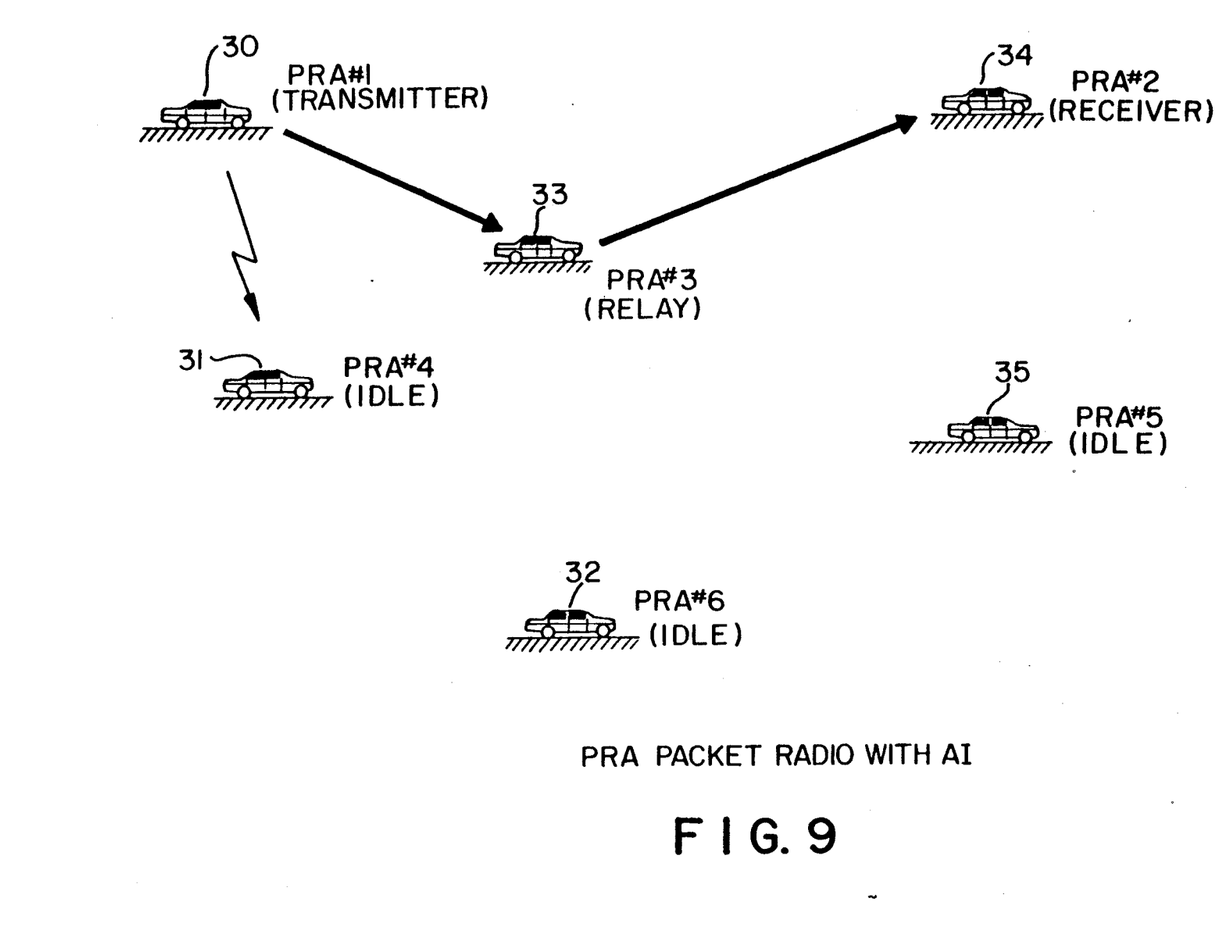
FIG. 9 is a block diagram of packet radio communication system according to this invention.

Referring to FIG. 9, there is shown a simple layout of a typical packet radio network. As one can ascertain from FIG. 9, a series of mobile vehicles such as 30, 31, 32, 33, 34, 35 each have a packet radio with each radio typically including an artificial intelligence apparatus and hence each of the radios are designated as a PRA. It would be desirable to establish a communication link between each of the requested mobile stations and any other one to enable communications therebetween.

As shown in FIG. 3, there is a detailed schematic of an artificial intelligence module and its interface with the packet radio network. As one can ascertain from FIG. 3, the artificial intelligence module contains an inference engine 4' which is associated with an induction engine 17, both of which are coupled to an expert system 16. As is well known, an inference engine as 4' is employed to check upcoming situations from the central data base 7 (FIG. 3) with the rules from the rule base 5 and to derive therefrom several conclusions which are stored in the knowledge base (KB).

As one can ascertain from FIG. 2 and FIG. 3, the knowledge base 8 is associated with the data base 7 both of which are located in the memory 6. The knowledge base 8, as well as the data base 7, interface with the microprocessor 4 and the microprocessor 4 has direct access to the PROM 5 which contains the rule base. The PROM 5 is also coupled to the memory 6 containing the knowledge base 8 and the data base 7. As indicated, the inference engine 4' (FIG. 3) is used to check upcoming situations with the rules and come up with several conclusions which are stored in the knowledge bases 13 and 14 as of FIG. 3.

The induction engine 17 (FIG. 3), is used to create new rules from the knowledge bases 13 and 14 of FIG. 3 which are the first or second knowledge bases (#1KB, #2KB). These new rules, which are derived from the knowledge base, are immediately placed into the rule base 5 (FIG. 3). The rule base, in this manner, has stored therein new rules which are derived from the previous data stored in the knowledge bases 13, 14 of FIG. 3. It is also understood that the expert 16 can intervene to provide a new rule after a rule is produced by the induction engine 17.

The fundamental operation of artificial intelligent modules can be had by referring to a text entitled "Principles of Artificial Intelligence" by N.J. Nilsson of S.R.I. International, published by Tioga Publishing Company of Palo Alto, Calif. See for examples page 72 where an heuristic graph-search procedure is explained. As explained in that text, for many tasks it is possible to use task-dependent information to help reduce the search time. Information of this sort is usually called heuristic information and search procedures using it are called heuristic search methods. It is often possible to specify such heuristics that reduce the search effort without sacrificing the guaranty of finding a minimal length path. Some heuristics greatly reduce search efforts but do not guaranty finding minimal cost paths. In most practical problems one is concerned in minimizing the combination of the cost of the path and the cost of the search required to obtain the path.

Furthermore, one is interested in search methods that minimize the combination average over all problems likely to be encountered. Average combination costs are never actually computed both because it is difficult to decide on the way to combine path costs and search effort costs and because it would be difficult to determine a probability distribution over the set of problems to be encountered. Therefore, the matter of deciding whether one search method has more heuristic power than another is usually left to informed intuition gained from actual experience with the methods. This heuristic approach will be subsequently explained.

Furthermore, by referring to the same text, pages 247 to 253 can understand the operation of the induction engine including the induction rules employed in such an engine. Essentially, the use of an induction engine involves the following. One first assumes an induction hypothesis, that is one assumes the goal expression which is true for all input lists. In this manner an input list for this system consists of all possible connections, as shown in FIG. 9, from each of the mobile units 31 to 35 utilizing any other mobile unit as for example 33 as a communications link or as a repeater station. The arbitrary list of possible connections are stored in memory. Next, given the induction hypothesis one attempts to prove the goal expression for all input lists where an input list is an arbitrary list of the induction hypothesis. If this is successful then the goal expression is true for all input lists and hence one can capture this argument in a single formula which is called the induction rule and which for example is described in detail on page 148 of the above-noted text. The above-noted text also shows the search graphs for a typical appended problem which is denoted in flow chart form on pages 250 and 251 of the text.

In a similar manner, as regarding induction, there are rules of inference which can be applied to certain sets or lists to produce new sets or lists. As explained in that text, an important inference rule is designated as modus ponens. Modus ponens is the operation that produces one list from other lists in special form. Thus, the entire aspect of an inference engine with inference rules is also well known in the prior art. See for example the above-noted text, pages 140 to 145.

Referring back to FIG. 9, when a communication link is established via a transmission, say from the mobile unit 30 (PRA-1) to the mobile unit 34 (PRA-2) one may employ, in the given, example PRA-3 or mobile unit 33 as a relay. As one can ascertain from FIG. 9, there are many idle PRA's in the field and one idle PRA is PRA-4 (31) which is shown in FIG. 9. The PRA-4 (31) receives the following information from the transmitted information via the communication link and stores that information in its data base. The data base in each PRA unit is shown for example in FIGS. 2 and 3 as data base 7. The following information is then stored in PRA-4 (31):

(a) the address of PRA-1 (30), which is the transmitter;
(b) the address of PRA-2 (34), which is the receiver;
(c) the address of PRA-3 (33), which is a relay or repeater PRA;
(d) the signal strength received by PRA-4 (31) from PRA-1;
(e) the time of occurrence of the transmission (time of day);
(f) the moving speed of PRA-1 as obtained from the rapid fading information which exists in the transmitted signal;
(g) the approximate distance from PRA-1 which is computed based on the signal strength of the transmitted signal of PRA-1 as received by the idle PRA, 32.

In this manner, PRA 32 also receives the signal from the relay PRA-3 (33). If PRA-3 (33) is close to PRA-4 (31) then PRA-4 (31) could also receive both transmissions from PRA-1 (30) and PRA-3 (33) at a different time interval.

In any event, the inference engine 4' of PRA-4 takes four or five communication links as located in the list stored in memory and uses the rules from the rule base to come up with adequate conclusions. For example, the following conclusions will reside in the knowledge base, 13: (a) PRA 6 (32) is the closest one at this time which again is shown in FIG. 9; (b) PRA 3 (33) always will be a relay station; (c) PRA 5 (35) does not move. In any event, then several suggested routes are obtained from the inference engine based on the information stored in the knowledge bases 13 and 14: (a) one employs PRA-3 as a relay to other PRAs; (b) one uses PRA 6 (32) if a call request is within five minutes from the present time; (c) one tries the next suggested route if this one is not working as obtained from the list.

In the data base there is a time counter to track current traffic activities. A traffic condition will be issued based on the traffic activities by the inference engine and based on and passed on to the knowledge base and fed back to the rule base. In the rule base, the rules can be implemented by different traffic conditions. For example, in light traffic conditions—Rule A—select a relay PRA based on the strong signal strength measured in the last five minutes. In heavy traffic conditions—Rule B—select a relay PRA based on the latest received link in the transmitted information.

Also, from the knowledge base, a lot of information can be used to reprocess and create a better rule. This is the essence of artificial intelligence. One example is as follows. A number of outcomes stored in knowledge bases 13, 14 of FIG. 3 shows that the probability of having a successful connection after the third try is extremely remote. Then the induction engine 17 will set up a rule after overview of the outcome from knowledge bases stating—"Do not make a try after the third try." It is a newly created rule coming from the induction engine 17. This new rule could be reviewed by the expert 16 before placing the same in the rule base 5. The review by the expert 16 is strictly according to routine or programming. Rules in the rule bases are very sensitive to different geographies, different times and different sessions or dates. The new special rules may be created from the induction engine 17 for this purpose as well.

Figure 10:
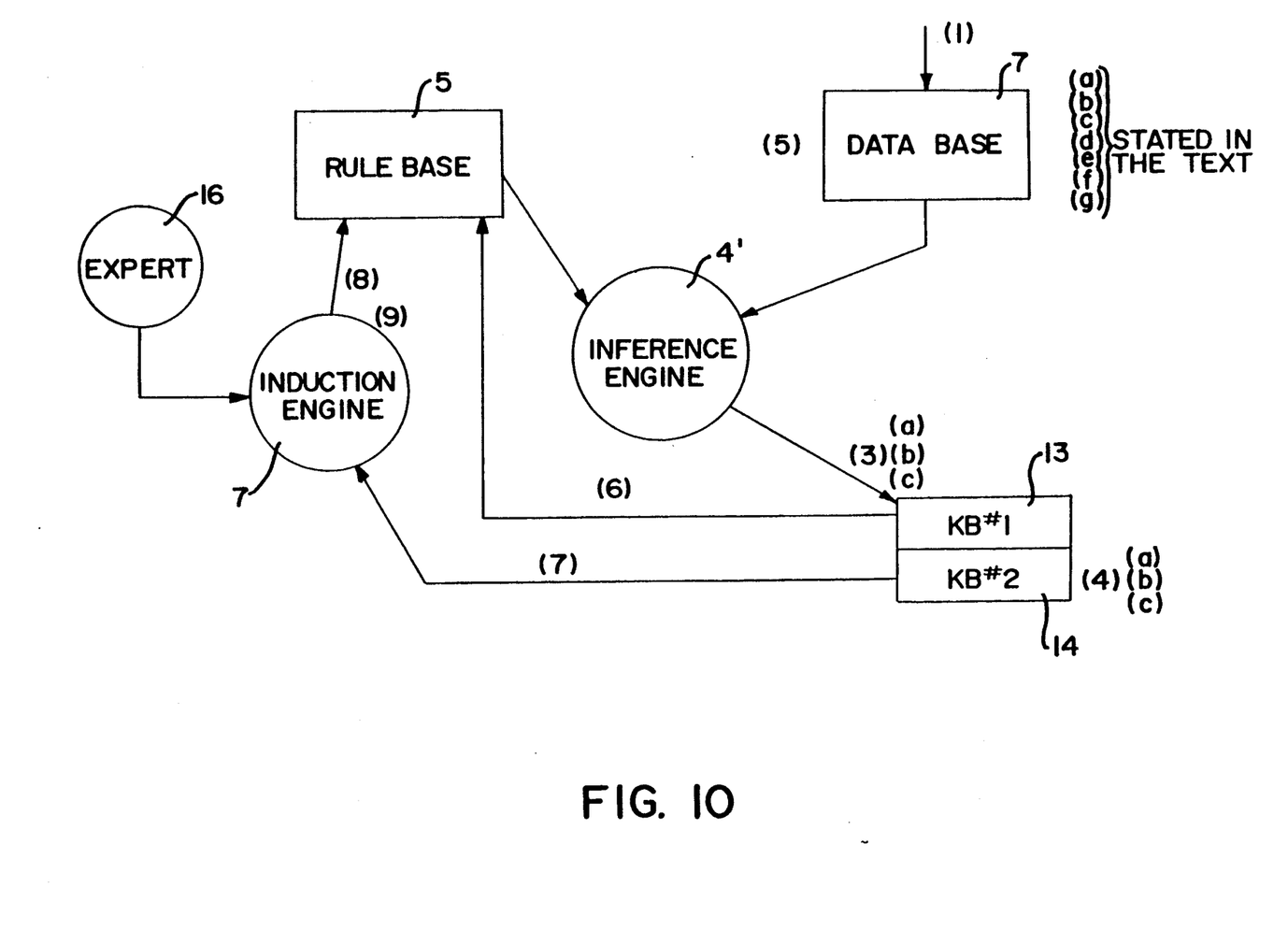
FIG. 10 is a block diagram of an artificial intelligence module useful in explaining the operation of FIG. 9.

Thus, referring to FIG. 10 there is shown the implementation of the above-noted system in regard to the above-described example and how the various components again interface with each other.

In FIG. 10 the same components retain the same reference numerals. In any event, in FIG. 10 the data base 7 is shown with the letters (a) through (g) which corresponds to the information as described in the above-noted text while the knowledge base (13, 14) is associated with letters (a) through (c) which also corresponds to the information in the above-noted text.

For other important and valuable information in order to further understand operation, reference is made to an article entitled "ARBY: Diagnosis With Shallow Casual Models", Proceedings of the National Conference on Artificial Intelligence (1982) pages 371-372, by Drew McDermott and Ruben Brooks, ITT Integrated Systems Center. The system describes a software system or higher order language for programming expert systems to do diagnosis in electronic systems. As indicated in the article, the ARBY is a software system or higher auto language for writing into expert systems. As such, it is similar to EMYCIN (a program for artificial intelligence systems) in application but quite different in design. As one can understand from that article there is described an expert system which includes in memories rules and facts indicative of the operation of a system and further gives particular programming sequences in order to implement the same.

See also a text entitled "Building Expert Systems" edited by F. Hayes-Roth et al., published in 1983 by Addison Wesley Publishing Company Inc. of Reading, Mass. This text describes modes of knowledge acquisition essentially which are analogous to the so-called induction engine. There are descriptions and applications of an expert system, an inference engine, the knowledge base and how one operates to program and derive systems in regard to such engines. The publication, on page 68, also describes the heuristic search and exactly how one implements an heuristic search. On page 287 the text also describes the EMYCIN system as indicated above and gives the overview of the EMYCIN system, including typical programming examples utilized in the EMYCIN system. In regard to this it describes the inference engine as employed in that system in great detail.

Thus, it should be apparent to one skilled in the art that the terms utilized in this application have clear meaning in the field and are well known. These terms include the term heuristic search, induction engine, inference engine and the above-noted examples should enable anyone to construct a system which will operate in accordance with the principles as described herein.

A feature of the present invention is a self-learning capability. The self-learning capability results from feedback to the rule base 5 or the induction engine 17 from the knowledge base (KB) 8, as shown by feedback paths 18 and 19 in FIG. 3. For example, rules may be selected or deleted based on the heavy traffic or light traffic condition, jamming conditions, or routing avoidance conditions from the knowledge base. Also, rules may be selected or deleted based on successful path connection. If the suggested routing obtained from KB #2 is successfully connected, then the rules associated with this selection should be given greater relative weight than other rules. This weight will be communicated back to the rule base from the knowledge base #2.

Another feature of the present invention is the self-creating knowledge base. The knowledge base is created automatically from the inference engine, based on the inputs from the data base and the rule base. Conventional expert systems create their knowledge bases before operation.

Still another feature of the present AI system is its allowance for the possibility of growth in capabilities. This growth includes the development of more efficient rules, additional improved criteria, and self learning capabilities by the application of induction systems. In military applications, there is a significant improvement of network survivabiity by the elimination of vulnerable networks routing nodes (stations).

The aforementioned features of a self-learning capability, a self-creating knowledge base, and growth in capabilities have applicability in many other artificial intelligence applications.

While a specific embodiment of the invention has been shown and described, further modifications and improvements will occur to those skilled in the art. All such modifications which do not depart from the spirit of the invention are intended to be included under the scope of the appended claims.

What is claimed is:

1. In a communications system of the type including a plurality of individual radio frequency transceivers wherein a communications link can be set up between a first one of said transceivers to any other one of said transceivers via various paths which paths may include other ones of said transceivers which other ones act as relays in said communications link, each of said transceivers capable of receiving and transmitting messages, the improvement in combination therewith comprising:

each of said plurality of transceivers having message transmitting and receiving means for transmitting and receiving messages between transceivers, selected ones of said plurality of transceivers each having an artificial intelligence apparatus coupled to its message receiving means for receiving messages which are transmitted from a transmitting transceiver to the selected transceiver or broadcasted within range of the selected transceiver for ultimate transmission to a receiving transceiver through a relaying transceiver which may include the selected transceiver itself, wherein said artificial intelligence apparatus coupled to selected ones of said transceivers in said system includes:

a microprocessor for processing message data indicative of selected attributes of transmitted messages between transceivers, as received by the selected transceiver, and selected attributes of the communications links in which said messages between transceivers are transmitted, a data base memory for storing therein said message data indicative of transmitted messages and communications links between said transceivers, a rule base memory for storing rules for establishing minimum criteria for said selected attributes of transmitted messages and communications links in order for particular ones of the communications links to be deemed as desired communications links by said artificial intelligence apparatus for radio transmissions between transceivers, an inference computing means connected to said data base memory and to said rule base memory and operative to scan the message data stored in said data base memory and to match the message data with the rules for establishing minimum criteria in said rule base memory in order to generate output conclusion data indicative of desired communications links, a knowledge base memory coupled to said inference computing means for storing said output conclusion data indicative of desired communications links, whereby the selected transceiver is enabled to relay transmitted messages on the desired communications links based on the conclusion data stored in its knowledge base memory.

2. The communication system according to claim 1, wherein said rule base memory is a programmable read only memory (PROM).

3. The communication system according to claim 1, wherein said knowledge base memory comprises:

a first memory section for storing all possible communications links, a second memory section for storing only one optimum communication link from a particular one transceiver to another transceiver in said system.

4. The communication system according to claim 1, further including an induction computing means connected to said knowledge base memory and to said rule base memory and operative to form new rules for storage in said rule base memory according to the data stored in said knowledge base memory.

5. The communication system according to claim 1, further including means coupling said knowledge base memory to said rule base memory wherein said data stored in said knowledge base memory can modify said stored rules.

6. The communication system according to claim 1, further including an expert port coupled to said rule base memory and operative to provide rules to said rule base memory, said expert port also coupled to said induction computing means for inducing rules from said expert port and to apply said induced rules to said rule base memory.

7. The communication system according to claim 1, wherein said transmitting and/or receiving transceivers are grouped in sub-groups of said transmitting and/or receiving means, at least two of said sub-group member means using different media, and further comprising:
an additional artificial intelligence module associated with said sub-group for selecting an optimum transmission path among best paths of each of said sub-groups.

8. The communication system according to claim 1, wherein said knowledge base and said data base memory consists of a single memory structure.

9. The communication system according to claim 1, wherein said inference computing means includes a microprocessor.

10. A method of communicating among a plurality of transceivers wherein a communication link can be set up between transceivers via various communications paths, comprising the steps of:
providing selected ones of said plurality of transceivers each with an artificial intelligence apparatus for monitoring messages which are transmitted from a transmitting transceiver to the selected transceiver or broadcasted within range of the selected transceiver for ultimate transmission to a receiving transceiver through a relaying transceiver which may include the selected transceiver itself,
processing message data indicative of selected attributes of transmitted messages between transceivers, as received by the selected transceiver, and selected attributes of the communications links in which said messages between transceivers are transmitted,
establishing a data base in memory of said message data processed in each respective one of said selected transceivers,
scanning said message data in said data base and matching the message data with criteria from a rule base established in memory for said selected attributes of transmitted messages and communications links in order for particular ones of the communications links to be deemed as desired communications links so as to generate transmission routing sequences for said transceivers,
storing said generated sequences in a knowledge base memory in the respective selected transceiver, and
establishing connectivity paths among said plurality of transceivers using said generated routing sequences stored in the knowledge base memories of the selected transceivers.

11. The method according to claim 10, further comprising the step of:
updating said routing sequences in said knowledge base memory in real time.

12. The method according to claim 10, wherein said step of establishing connectivity paths results in distributed routing of communications among said plurality of transceivers.

13. The method according to claim 7, wherein said matching step is based on traffic conditions and/or connection successfulness.

14. An artificial intelligence apparatus module for use with radio networks, of the type including a plurality of individual radio frequency transceivers wherein a communications link can be set up between a first one of said transceivers to any other one of said transceivers via various paths which paths may include other ones of said transceivers which other ones act as relays in said communications link, each of said transceivers having a radio transmitter and receiver, and at least one of said transceivers being a selected transceiver for generating routing sequences to be used among said plurality of transceivers, comprising:
input means for coupling said artificial intelligence apparatus module to the receiver of said selected transceiver for receiving messages which are transmitted among said plurality of transceivers;
a microprocessor for processing message data indicative of selected attributes of the transmitted messages as received by the selected transceiver, and selected attributes of the communications links in which said messages between transceivers are transmitted;
a data base memory for receiving said message data from said microprocessor;
a rule base memory capable of being programmed with a set of rules for establishing minimum criteria for said selected attributes of transmitted messages and communications links in order for particular ones of the communications links to be deemed as desired communications links by said artificial intelligence apparatus for radio transmissions between transceivers;
an inference engine connected to said data base memory and to said rule base memory and functioning to scan the message data in said data base memory and to match this message data with the rules for establishing minimum criteria in the rule base memory so as to generate information indicative of desired communications links;
a knowledge base memory connected to said inference engine which receives said information generated by said inference engine, whereby the artificial intelligence module can enable the selected transceiver to relay transmitted messages on the desired communications links based on the information stored in the knowledge base memory.

15. The artificial intelligence module of claim 14, further comprising a communication path from said knowledge base memory to said rule base memory.

16. The artificial intelligence module of claim 14, further comprising an induction engine, connected to said knowledge base memory, to said rule base memory, and to an expert input port, functioning to formulate rules for said rule base memory.

17. The artificial intelligence module of claim 14, wherein said rule base memory is a programmable read only memory (PROM).

* * * * *